United States Patent [19]
Tulpule

[11] Patent Number: 5,791,155
[45] Date of Patent: Aug. 11, 1998

[54] SYSTEM FOR MONITORING EXPANSION VALVE

[75] Inventor: Sharayu Tulpule, Farmington, Conn.

[73] Assignee: Carrier Corporation, Syracuse, N.Y.

[21] Appl. No.: 869,535

[22] Filed: Jun. 6, 1997

[51] Int. Cl.$^6$ .................... G06E 1/00; F25B 41/00
[52] U.S. Cl. .................... 62/211; 236/78 D; 395/21
[58] Field of Search .................... 395/22; 62/211, 62/225; 236/78 D

[56] References Cited

U.S. PATENT DOCUMENTS

| | | | |
|---|---|---|---|
| 4,660,386 | 4/1987 | Hansen et al. | 62/126 |
| 5,260,526 | 11/1993 | Sirag | 187/127 |
| 5,333,240 | 7/1994 | Matsumoto et al. | 395/23 |
| 5,372,015 | 12/1994 | Suzuki et al. | 236/78 D |
| 5,598,076 | 1/1997 | Neubauer et al. | 395/21 |

FOREIGN PATENT DOCUMENTS 4051172382  7/1993  Japan ................ 236/78 D

*Primary Examiner*—William E. Wayner

[57] ABSTRACT

A monitoring system for a heating or cooling system includes a neural network for computing the status of one or more expansion valves within the system. The neural network is trained to learn certain characteristics of the heating or cooling system during a development mode of operation. The thus trained neural network timely computes the status of the one or more expansion valves during a run time mode of operation. Information as to the status of the one or more expansion valves is made available for real time assessment during the run time mode of operation.

33 Claims, 6 Drawing Sheets

SYSTEM FOR MONITORING EXPANSION VALVE

BACKGROUND OF THE INVENTION

This invention relates to monitoring the operation of a heating or cooling system, and more specifically to monitoring the operation of an expansion valve within a refrigeration circuit in such systems.

Many heating and/or cooling systems employ a refrigeration circuit that either absorbs heat through a heat exchanger in the case of a cooling system or gives off heat through a heat exchanger in the case of a heating system. These heat exchangers contribute either directly or indirectly to the cooling or heating of the air in a building. An expansion valve within the refrigeration circuit of such systems will open or close by given amounts in response to commands from a controller for the heating or cooling system. Occasionally, these expansion valves do not respond appropriately to the commands from the controller. This occurs when the expansion valve becomes stuck in a given position. Such a stuck or faulty expansion valve will cause the heating or cooling system to operate at less than full efficiency. It may also lead to a system failure if, for instance, liquid refrigerant passes through the expansion valve and enters a compressor.

Heating or cooling systems have heretofore been equipped with a variety of alarms that may indirectly indicate a faulty or stuck expansion valve. For instance, a chiller system equipped with alarms located primarily at the inlet side of one or more of the system's compressors may be triggered due to a faulty or stuck expansion valve. These alarms may, however, also be triggered due to other problems occurring within the system. For example, alarms for monitoring suction pressure or suction temperature at the inlet of the compressor may also be triggered due to a low level of refrigerant charge within the refrigeration circuit of the chiller. These alarms may also not trigger until the expansion valve has remained stuck for an appreciable period of time. This would occur if the thresholds for the alarms were improperly set. For example, the alarms for monitoring suction pressure or suction temperature at the inlet of the compressor may be set too low.

It is an object of the invention to detect a faulty or stuck expansion valve without relying on individual thresholds of one or more alarms being exceeded.

It is another object of the invention to detect a faulty or stuck expansion valve without relying on alarms that may be triggered for a variety of reasons other than a stuck expansion valve.

SUMMARY OF THE INVENTION

The above and other objects are achieved by providing a monitoring system with the capability of first performing a collective analysis of a number of conditions within a heating or cooling system that can be used to predict the correct position of at least one expansion valve. The monitoring system utilizes a neural network to learn how these conditions are affected by the operation of the expansion valve. This is accomplished by subjecting the heating or cooling system to differing ambient and building loads for a variety of different commanded valve positions of the one or more expansion valves. Data produced by sensors within the heating or cooling system is collected in conjunction with the information on the controller commands to the one or more expansion valves.

The collected data is applied to the neural network within the monitoring system in a manner which allows the neural network to learn to accurately compute the expansion valve position for any particular set of the collected data. The neural network preferably consists of a plurality of input nodes, each receiving one piece of data from a defined set of data. The defined set of data preferably includes at least one piece of data that is computed by the controller rather than being merely collected from a sensor. Each input node is connected to some of the nodes of a functional link layer within the neural network. The nodes of the functional link layer are furthermore connected via weighted connections to two output nodes in a preferred embodiment. The two output nodes produce computed valve positions for two separate expansion valves within two separate refrigeration circuits. The monitoring system would work equally well for a single refrigeration circuit employing a single expansion valve wherein only one output node would be present.

The input nodes are also connected to the one or more output nodes of the neural network by various weighted connections. These weighted connections, as well as those between the functional link layer nodes and the output nodes, are continuously adjusted during repetitious application of the data until such time as the one or more output nodes produce computed valve positions substantially equal to the controller commands for the respective expansion valves. The finally adjusted weighted connections are thereafter stored for use by the monitoring system during a run time mode of operation.

The monitoring system uses the thus developed and tested neural network during a run time mode of operation to analyze sets of real time data being provided by a functioning heating or cooling system. Each set of real time data includes sensor data and certain computed data that is applied to the neural network. This data is processed through the nodes of the neural network having the various finally adjusted weighted connections so as to produce computed valve positions for one or more expansion valves. The computed valve positions are compared with commanded valve position data collected during the run time mode of operation. Any significant error between the computed expansion valve positions and the commanded valve positions is noted and displayed as a stuck expansion valve condition. The display is continually updated as the monitoring system processes further real time data. A decision can be made as to whether to shut down the heating or cooling system for appropriate servicing as a result of the continuing display of a stuck expansion valve.

In a preferred embodiment of the invention, the operability of two expansion valves within two different refrigeration circuits of a chiller are particularly monitored. The monitoring system receives information from seven different sources within the chiller as well as two computed pieces of information from the controller of the chiller. These pieces of information are processed through the neural network within the monitoring system so as to produce computed expansion valve positions. The computed expansion valve positions are compared with the actually commanded expansion valve positions with any significant error being noted and displayed.

BRIEF DESCRIPTION OF THE DRAWINGS

The invention will become more apparent by reading a detailed description thereof in conjunction with the following drawings, wherein.

DESCRIPTION OF THE PREFERRED EMBODIMENT

Figure 1:
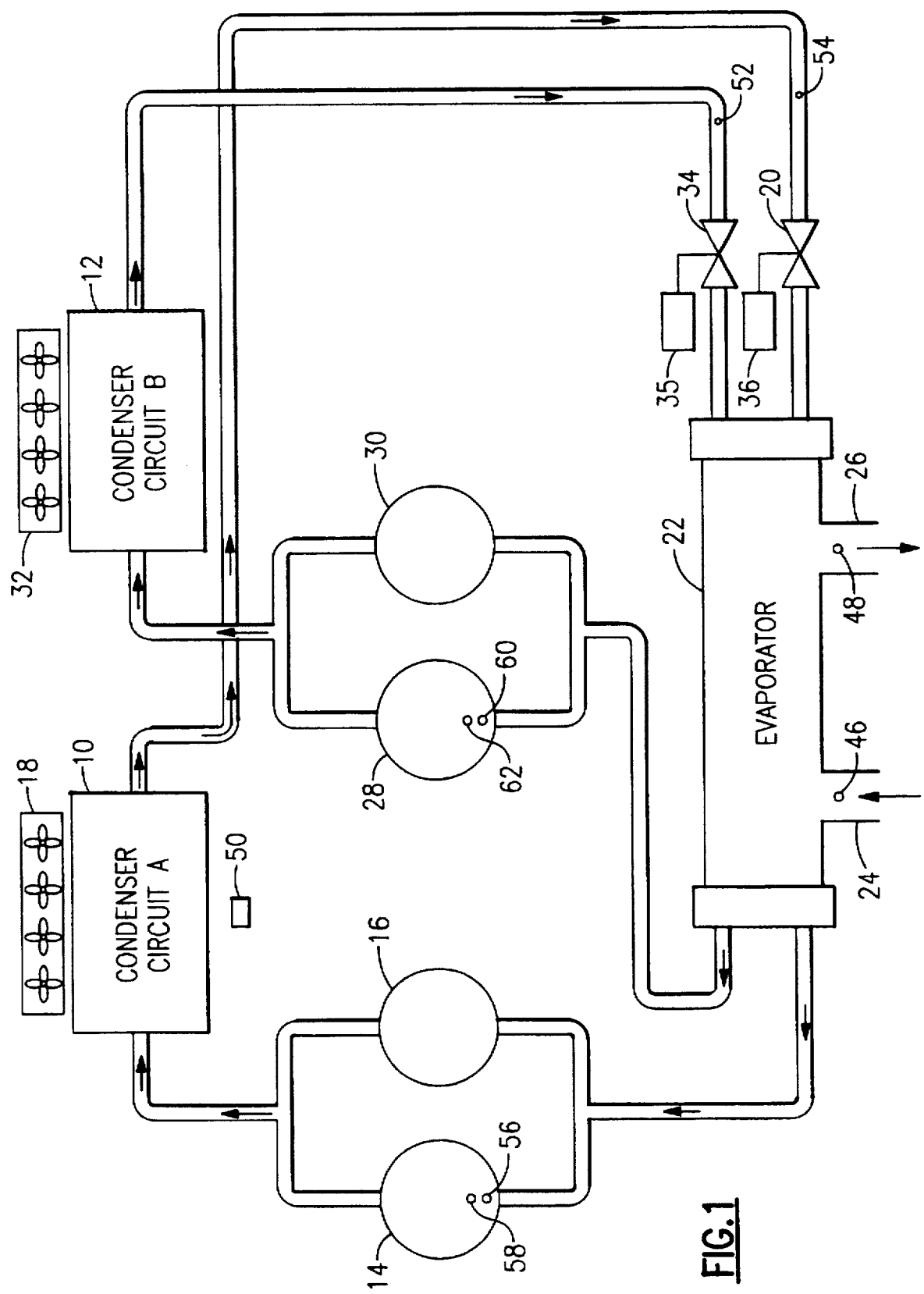
FIG. 1 is a schematic diagram of a chiller including two refrigeration circuits each having a respective expansion valve.

Referring to FIG. 1, a chiller is seen to include two separate refrigeration circuits "A" and "B", each of which has a respective condenser 10 or 12. In order to produce cold water, the refrigerant is processed through chiller components in each respective refrigeration circuit. In this regard, refrigerant gas is compressed to high pressure and high temperature in a pair of compressors 14 and 16 in circuit A. The refrigerant is allowed to condense to liquid giving off heat to air flowing through the condenser 10 by virtue of a set of fans 18. The condenser preferably allows the liquid refrigerant to cool further to become subcooled liquid. This subcooled liquid passes through an expansion valve 20 before entering an evaporator 22 commonly shared with refrigeration circuit B. The refrigerant evaporates in the evaporator 22 absorbing heat from water circulating through the evaporator 22 from an input 24 to an output 26. The water in the evaporator gives off heat to the refrigerant and becomes cold. The cold or chilled water ultimately provides cooling to a building. The cooling of the building is often accomplished by a further heat exchanger (not shown) wherein circulating air gives off heat to the chilled or cold water. It is to be noted that refrigerant is also compressed to high pressure and temperature through a set of compressors 28 and 30 in refrigeration circuit B. This refrigerant is thereafter condensed to liquid in condenser 12 having a set of fans 32 which cause air to flow through the condenser. The refrigerant leaving condenser 12 passes through expansion valve 34 before entering the evaporator 22. The valve position of the expansion valve 34 is defined by a stepper motor 35 whereas the valve position of the expansion valve 20 is defined by a stepper motor 36.

Figure 2:
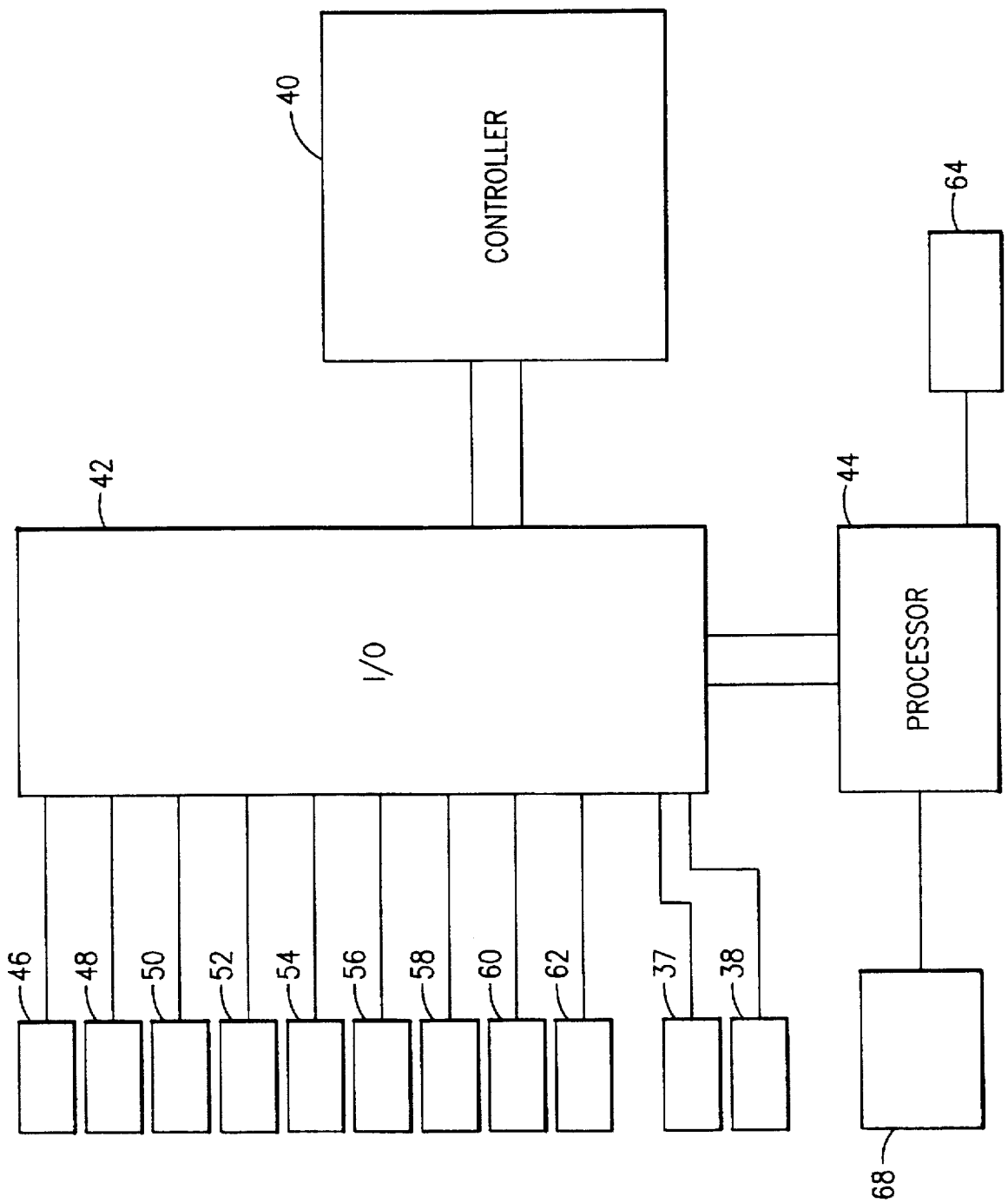
FIG. 2 is a block diagram of a controller for the chiller of FIG. 1 plus a processor containing neural-network software for checking the operative status of each expansion valve.

Referring to FIG. 2, a controller 40 sends valve position commands to a motor control 37 for stepper motor 35 and to a motor controller 38 for the stepper motors 36. The commanded position sent to the motor controls 37 and 38 for the stepper motors 35 and 36 vary between a completely closed position to a one hundred percent completely open position. The motor controls convert the commanded expansion valve positions into amounts of movement for the respective stepper motors based on the noted present valve position and the commanded valve position. The stepper motors will incrementally step up or down to the respective commanded valve positions. It is to be appreciated that the controller 40 also controls the set of fans 18 and 32 through relay switches (not shown) so as to thereby define the amount of air circulating through the condensers 10 and 12. The controller also selectively controls compressors 14, 16, 28 and 30 through relay switches (not shown) so as to thereby determine the on and off status of the compressors. The aforementioned control of the expansion valves and relay switches for the fan sets and compressors is via an IO bus 42 which provides information from the controller to the respective control points within the chiller system. The controller also receives sensed measurements of certain conditions within the chiller system. These include sensors 46 and 48 mounted at the water inlet and the water outlet points of the evaporator 22. The sensor 46 measures the entering water temperature to the evaporator whereas the sensor 48 measures the leaving water temperature. These temperatures will be hereinafter referred to as EWT for entering water temperature and LWT for leaving water temperature. A sensor 50 senses the temperature of the air entering the condenser 10. This temperature will be hereinafter referred to as CEAT for condenser entering air temperature. A set of sensors 52 and 54 measure the respective subcooled temperatures of the refrigerants in circuits A and B. These particular temperatures will be hereinafter referred to as SUBCA for the subcooled temperature of the refrigerant in circuit A and SUBCB for the subcooled temperature of the refrigerant in circuit B. The controller also receives the sensed compressor suction temperatures and suction pressures of the compressors 14 and 28 in the respective refrigerant circuits. The suction temperature and suction pressure for compressor 14 are sensed by sensors 56 and 58 at the inlet side of this compressor. The compressor suction temperature as sensed by sensor 56 will be hereinafter referred to as ST_A whereas the compressor suction pressure will be hereinafter referred to as SP_A. The suction temperature and suction pressure for compressor 28 are sensed by sensors 60 and 62 mounted to the inlet of this compressor. The suction temperature for compressor 28 will be hereinafter referred to as ST_B whereas the suction pressure as sensed by sensor 62 will be hereinafter referred to as SP_B.

As will be explained in detail hereinafter, the processor 44 will receive the sensed measurements for EWT, LWT, CEAT, ST_A, SUBCA, SUBCB, and ST_B from the controller 40 via the IO bus 42. The processor will receive these values each time the controller reads them from the respective sensors. This preferably occurs every three minutes. The processor 44 will also receive the commanded valve positions for the expansion valves 20 and 34. The processor will still furthermore receive computed superheat temperatures for the compressor 14 and the compressor 28 at such time as the aforementioned measurements are available. These respective superheat temperatures will have been computed by the controller 40 as a function of the suction temperature and suction pressure for the respective compressors. The computation within the controller for the superheat temperature of the compressor 14 in refrigeration circuit A is preferably obtained by subtracting a saturated suction temperature value from the value of the suction temperature ST_A. The saturated suction temperature values will have been derived by the controller 40 having noted the suction pressure SP_A at the compressor inlet and converting it to a saturated suction temperature value based on a table of saturated suction temperature versus suction pressures for particular refrigerants. The superheat for the compressor 28 will be similarly computed by the controller 40.

The calculated superheats for the compressors 14 and 28 will be hereinafter referred to as superheat temperature SH_A for the compressor 14 and superheat temperature SH_B for compressor 28. These superheat values as well as the sensor information values and the commanded valve positions will all be preferably stored as a set of data in a storage device 64.

The processor is furthermore connected to a display 68 which may be part of a control panel for the overall chiller. The display is used by the processor 44 to provide information relative to the operative status of the expansion valves 20 and 34 during a run time mode of operation of the neural network software residing within the processor 44. This displayed information would be available to anyone viewing the control panel of the chiller.

Figure 3:
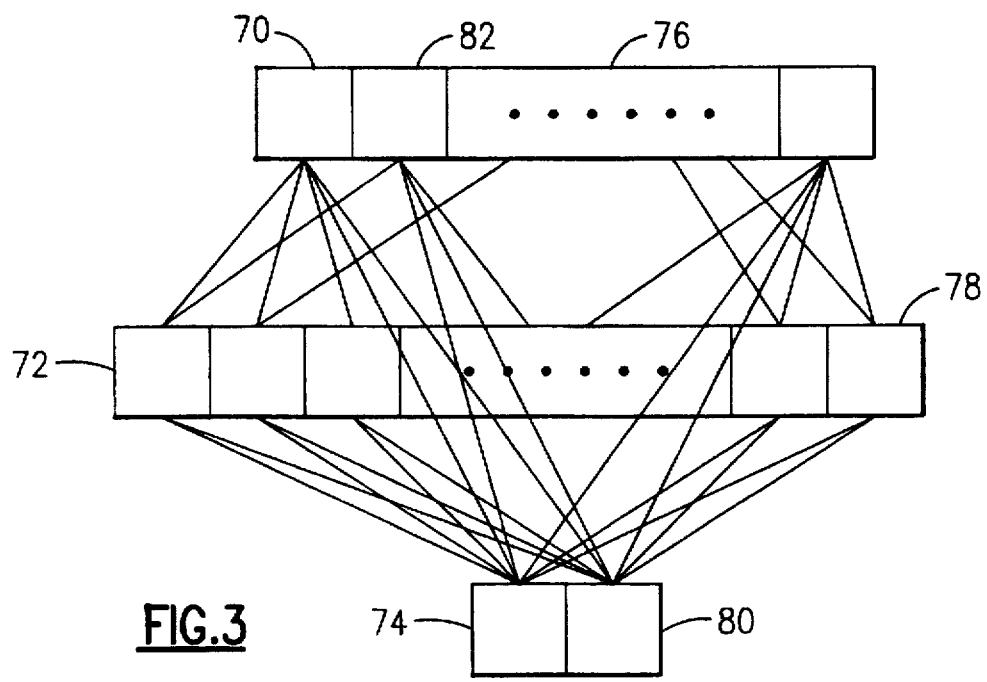
FIG. 3 is a diagram depicting the connections between nodes in various layers of the neural-network software.

The neural network that is first trained and thereafter used by the processor 44 in a run time mode is a massively parallel, dynamic system of interconnected nodes such as 70, 72, and 74 in FIG. 3. The nodes are organized into layers such as an input layer 76, a functional link layer 78 and an output layer consisting of the output node 74 and a second output node 80. The input layer 76 preferably consists of nine input nodes, each of which receives either a sensed value from one of the sensors 46, 48, 50, 52, 54, 56 or 60 or one of the computed superheat values SH_A and SH_B. The functional link layer 78 preferably includes thirty-six nodes. It is to be noted that only two input nodes may be connected to any given node in the functional link layer. For example, input nodes 70 and 82 are the only nodes connected to functional link node 72. Each of the input nodes is also connected to each of the output nodes 74 and 80. The output nodes 74 and 80 may also be connected to each of the nodes of the functional link layer 78. The connections between the input nodes and the output nodes have weighted values that are defined during a development mode of operation. The connections between the functional link nodes and the output nodes also have weighted values that are defined during the development mode of operation. These weighted values are used to compute values at the output nodes. The values computed at the output nodes 74 and 80 will be valve positions for the respective expansion valves 20 and 34. These computed expansion valve positions should substantially match the commanded positions for the respective expansion valves as provided by the controller 40 during a run time mode of operation.

Figure 4:
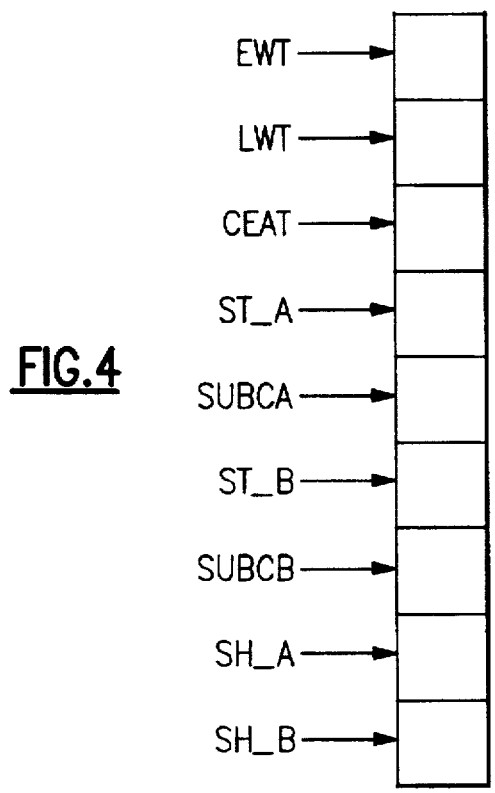
FIG. 4 is a block diagram depicting the data inputs to of the first layer of nodes in FIG. 3.

Referring to FIG. 4, the various inputs to the input layer 76 are shown. These inputs are the seven respective sensor measurements EWT, LWT, CEAT, ST_A, SUBCA, ST_B, and SUBCB. These inputs also include the computed superheats SH_A and SH_B. Each of these inputs becomes a value of one of the input nodes such as the input node 70.

Figure 5A:
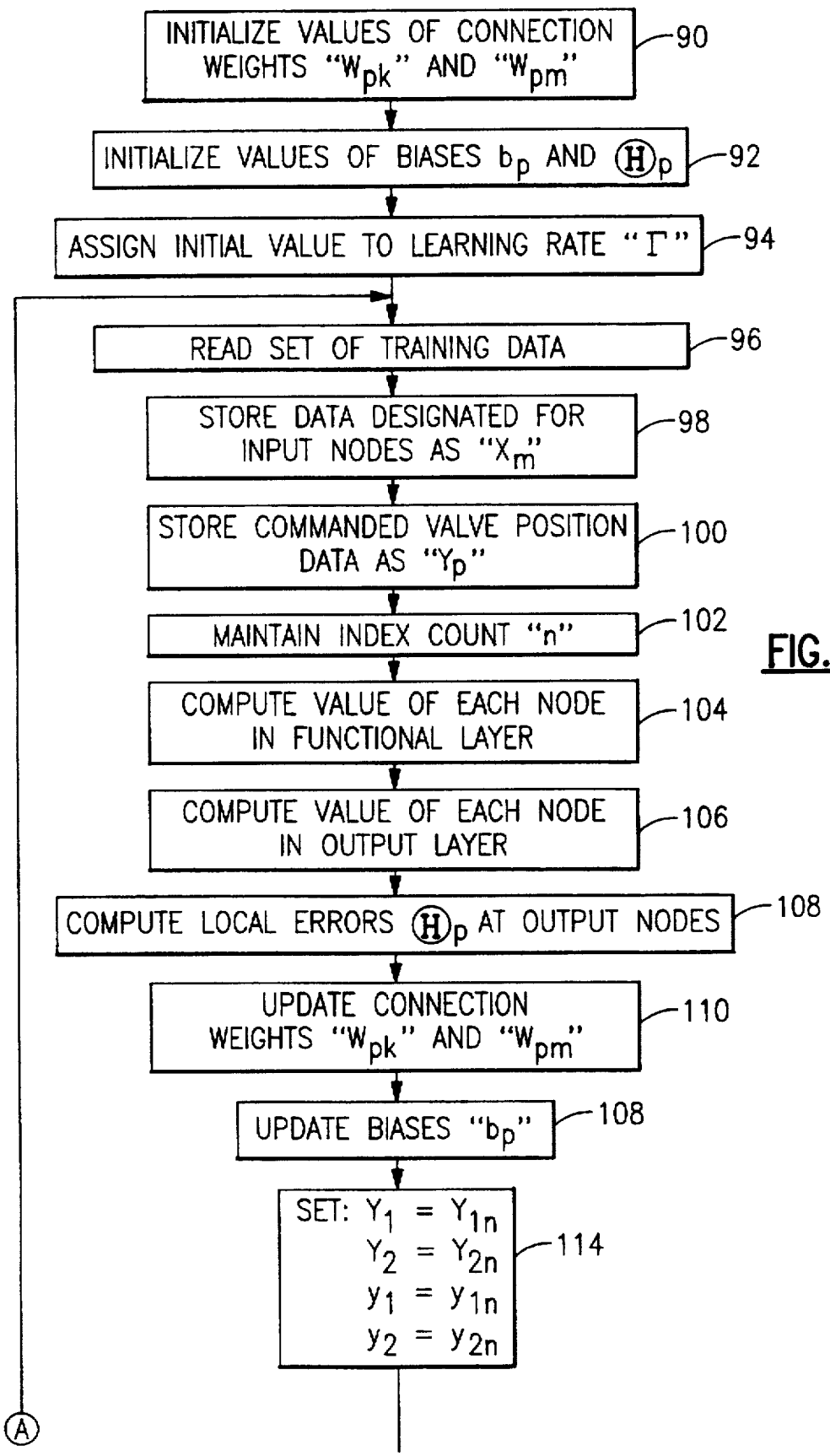
FIG. 5 is a flow chart of a neural-network process executed by the processor of FIG. 2 during a development mode of operation.
Figure 5B:
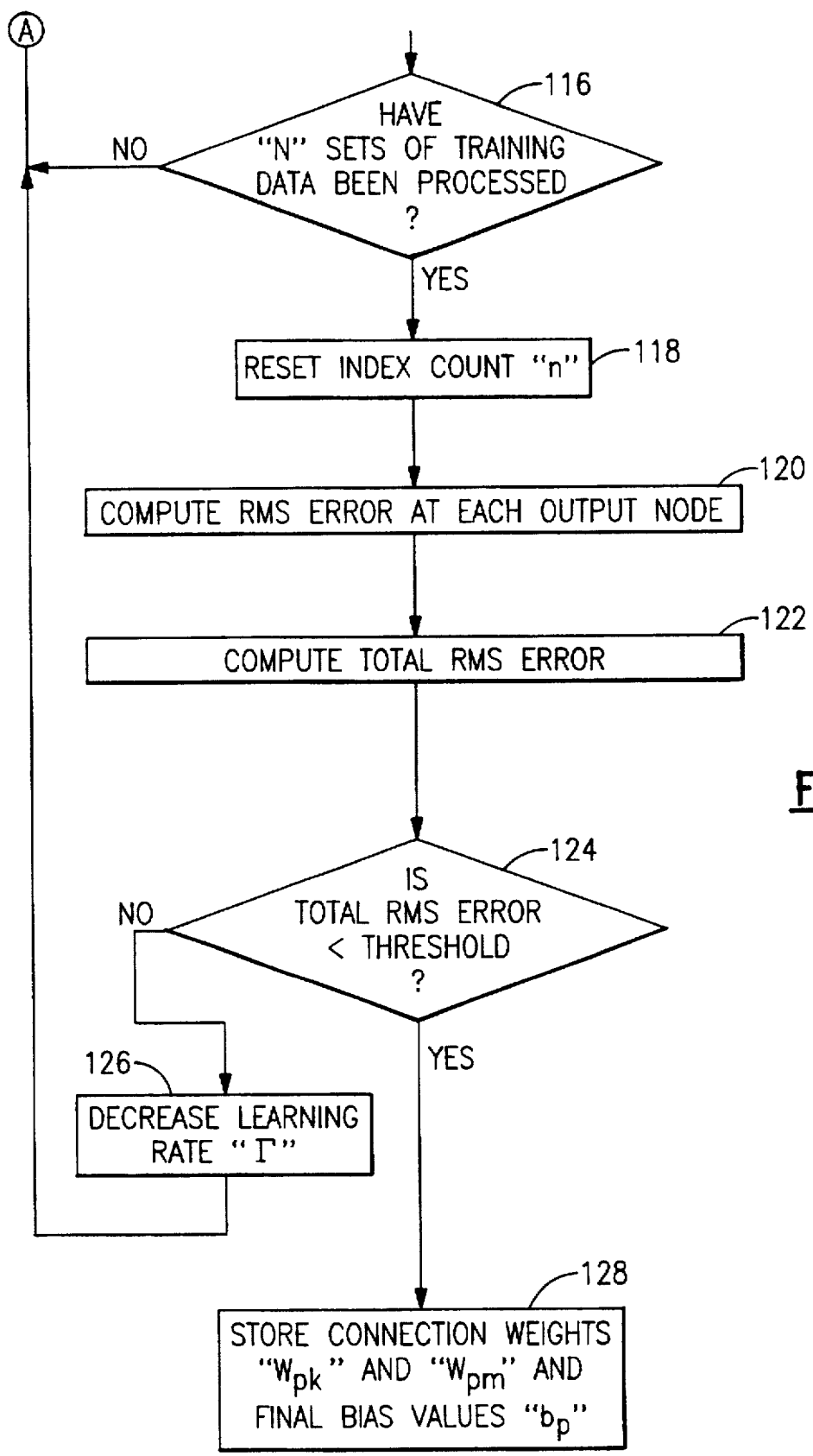

Referring now to FIG. 5, a flow chart of the processor 44 executing neural network training software during the development mode of operation is illustrated. The processor begins by assigning initial values to the connection weights "$W_{pk}$" and "$W_{pm}$" in a step 90. It is to be noted that the subscript "p" refers to one of the two output nodes, whereas the subscript "k" refers to one of the thirty-six functional link layer nodes and the subscript "m" refers to one of the nine input nodes. The processor proceeds in a step 92 to assign initial values to biases "$b_p$". These biases are used in computing respective values of the output nodes 74 and 80. The initial values for these biases are fractional numbers between zero and one. The processor also assigns an initial value to the variables $\Theta_p$ associated with the computations at the output nodes in step 92. These initial values are preferably decimal values that are closer to zero than to one. Further values will be computed for $b_p$ and $\Theta_p$ during the development mode. The processor next proceeds to a step 94 and assigns initial values to learning rate. The learning rate is to be used in computations as will be explained hereinafter. The initial value for the learning rate $\Gamma$ is a decimal number greater than zero and less than one.

The processor will proceed to a step 96 and read a set of training data from the storage device 64. The set of training data will consist of the seven values previously obtained by the controller from each of the seven sensors 46, 48, 50, 52, 54, 56, and 60 as well as the superheat values computed by the controller. The set of training data will also preferably include the commanded expansion valve positions by the controller at the time the sensor information was originally read and stored in the storage device. This set of training data will have been provided to the processor 44 when the chiller was subjected to a particular ambient and a particular load condition during one of the data gathering operations.

As has been previously discussed, the processor 44 will have downloaded a considerable amount of training data information to the storage device 64 during the time that the chiller of FIG. 1 is being subjected to various ambient and building load conditions. The training data is typically gathered for operational times ranging from three hours to twenty hours. To subject the chiller to different load conditions, hot water may be circulated through the evaporator 22 so as to simulate various building load conditions. The collected data for the many building load and ambient load conditions will be stored as sets of data in the storage device 64. Each set of collected data will consist of the aforementioned sensed values as well as the computed superheat values and will additionally include the commanded valve positions to the motor controls 37 and 38 for the stepper motors 35 and 36 of the respective expansion valves. The processor will proceed to store the values of EWL, LWT, CEAT, ST_A, SUBCA, ST_B, SUBCB, SH_A and SH_B in the respective input nodes of the input layer in step 96. These input values will be stored in step 98 as values "$x_m$" where "m" equals one through nine and identifies the stored value in each one of the input nodes of the input layer. The processor will also store the read values of commanded valve positions as values "$Y_p$" where "p" equals either one or two and identifies which commanded valve position is to be associated with which output node. In this regard, "$Y_1$" will be the commanded position for the expansion valve 20 to be associated with output node 74 having a subscript "p" value of one. "$Y_2$" will be the commanded valve position for the expansion valve 34 to be associated with output node 80 having a subscript "p" value of two. The output node 74 will be trained to compute the commanded position for the expansion valve 20 whereas the output node 80 will be trained to compute the position of the expansion valve 34. The processor will proceed to a step 102 and maintain an indexed count of the number of sets of training data that have been read in step 96 and stored in steps 98 and 100. The processor will proceed to compute the node value of each node in the functional link layer in a step 104. The value of each functional link layer, $Z_k$, is preferably computed by taking the value of a particular input node and multiplying it by the value of the next successive input node. This may be generally expressed as:

$$z_k = x_m \bullet x_{m+1}$$

where, k=1 to 8, m=1, m+1=2 to 9
k=9 to 15, m=2, m+1=3 to 9
k=16 to 21, m=3, m+1=4 to 9
k=22 to 26, m=4, m+1=5 to 9
k=27 to 30, m=5, m+1=6 to 9
k=31 to 33, m=6, m+1=7 to 9
k=34 to 35, m=7, m+1=8 and 9
k=36, m=8, m+1=9

The above will lead to the following functional link node computations occurring at the particular functional link nodes:

$z_1 = x_1 \bullet x_2$ $z_9 = x_2 \bullet x_3$ $z_{16} = x_3 \bullet x_4$ $z_{22} = x_4 \bullet x_5$ $z_{27} = x_5 \bullet x_6$ $z_{31} = x_6 \bullet x_7$ $z_{34} = x_7 \bullet x_8$ $z_{36} = x_8 \bullet x_9$ The processor will proceed from step 104 to a step 106 and compute values of each of the output nodes 74 and 80. The output node values are preferably computed as the hyperbolic tangent function of either the variable "t" for node 74 or the hyperbolic tangent function of the variable "u" for node 80.

$$y_1 = (e^t - e^{-t})/(e^t + e^{-t})$$

$$\text{wherein } t = \sum_{k=1}^{36} w_{1k}z_k + \sum_{m=1}^{9} w_{1m}x_m + b_1$$

$$y_2 = (e^u - e^{-u})/(e^u + e^{-u})$$

$$\text{wherein } u = \sum_{k=1}^{36} w_{2k}z_k + \sum_{m=1}^{9} w_{2m}x_m + b_2)$$

where, $z_k$=functional link node value, k=1, 2, ..., 36;

$w_{1k}$=weight for $1^{st}$ output node connected to $k^{th}$ functional link node;

$w_{2k}$=weight for $2^{nd}$ output node connected to $k^{th}$ functional link node;

$x_m = m^{th}$ input node value, $w_{1m}$=weight for $1_{st}$ output node connected to $m^{th}$ input node $w_{2m}$=weight for $2_{nd}$ output node connected to $m^{th}$ input node $b_1$=bias for output node 74;

$b_2$=bias for output node 80;

The processor now proceeds to a step 108 and computes the local error $\Theta_p$ for each node within the output layer.

$\Theta_1 = (y_1 - y_1) \bullet (1+y_1) \bullet (1-y_1)$ $\Theta_2 = (y_2 - y_2) \bullet (1+y_2) \bullet (1-y_2)$ The processor will proceed from a step 108 to a step 110 and update the connection weights "$w_{pk}$" defining the connections of the output nodes with respect to the functional link nodes as well as the connection weights "$w_{pm}$" defining the connection of the output nodes with respect to the input layer nodes.

$w_{pk,new} = w_{pk,old} + \Delta w_{pk,old}$ $\Delta w_{pk,old} = \Gamma \Theta_{p,new} z_k$ $w_{pm,new} = w_{pm,old} + \Delta w_{pm,old}$ $\Delta w_{pm,old} = \Gamma \Theta_{p,new} x_m$ where "p" equals one for the output node 74;

"p" equals two for the output node 80;

$\Gamma$ is the learning rate factor either initially assigned in step 94 or as assigned after further processing of training data;

$\Theta_{p,new}$ is either $\Theta_{1,new}$ or $\Theta_{2,new}$ as computed in step 108 for the respective output node;

$z_k$ is the computed functional link node value for the $k^{th}$ node in step 104;

$x_m$ is the input value for the $m^{th}$ input node.

The processor will proceed in a step 112 to update the bias values $b_p$ for the respective output nodes. These bias values are calculated as follows:

$b_{1,new} = b_{1,old} + \Gamma \Theta_{1,new}$ $b_{2,new} = b_{2,old} + \Gamma \Theta_{2,new}$ The processor will proceed from step 112 to step 114 and store the computed values $y_1$ and $y_2$ of each output node as "$y_{1n}$" or "$y_{2n}$". The processor will also store the corresponding commanded valve position values as "$Y_{1n}$" and "$Y_{2n}$". The "n" in this case designates the indexed count as maintained in step 102 as to the count of sets of data read in step 96.

The processor will proceed from step 114 to a step 116 and inquire as to whether "N" sets of training data have been processed. This is a matter of checking the indexed count of the read sets of training data established in step 102. In the event that further sets of training data are to be processed, the processor will proceed back to step 96 and read the next set of training data from the storage device 64. The indexed count of the thus read set of data will be incremented in step 102. It is to be appreciated that the processor will repetitively execute steps 96 through 114 until all "N" sets of training data have been processed. It is to be appreciated that the "N" sets of training data that are herein referred to are stored sets of training data in the storage device 64. These "N" sets of training data will be appropriately stored in addressable storage locations so that the next set can be accessed each time step 96 is encountered. When all "N" sets of training data have been processed, the processor will reset the indexed count of the read set of training data in a step 118. The processor will thereafter proceed to a step 120 and compute the RMS error at each output node. The RMS errors for the respective output nodes is calculated as follows:

$$RMS \text{ Error}_1 = \left[ \left( \sum_{n=1}^{N} (y_{1n} - Y_{1n})^2 \right) / N \right]^{-1/2}$$

$$RMS \text{ Error}_2 = \left[ \left( \sum_{n=1}^{N} (y_{2n} - Y_{2n})^2 \right) / N \right]^{-1/2}$$

It is to be noted that the values of "$y_{1n}$" and "$Y_{1n}$" as well as "$y_{2n}$" and "$Y_{2n}$" were stored in step 114.

The processor will proceed from having calculated individual RMS errors to step 122 wherein a total RMS error is computed as follows:

Total RMS Error = RMS Error$_1$ + RMS Error$_2$

The processor proceeds to a step 124 to inquire as to whether the Total RMS Error is less than a threshold value of preferably cool. When the Total RMS Error is not less than this particular threshold, the processor will proceed to a step 124 and decrease the learning rate $\Gamma$. This value will preferably be decreased in increments of one-tenth of the previously assigned value.

The processor proceeds to again process the "N" sets of data performing the computations of steps 96 through 122. The processor will again inquire in step 124 as to whether the newly computed total RMS Error is less than the threshold value. It is to be appreciated that at some point, the computed total RMS error will be less than this threshold. This will prompt the processor to proceed to a step 128 and store all computed connection weights, "$w_{pk}$" and "$w_{pm}$". The processor will also store all final bias values, "$b_p$". As will now be explained, these stored values are to be used by the processor during a run time mode of operation to compute expansion valve positions for the two respective expansion valves 20 and 32.

Figure 6:
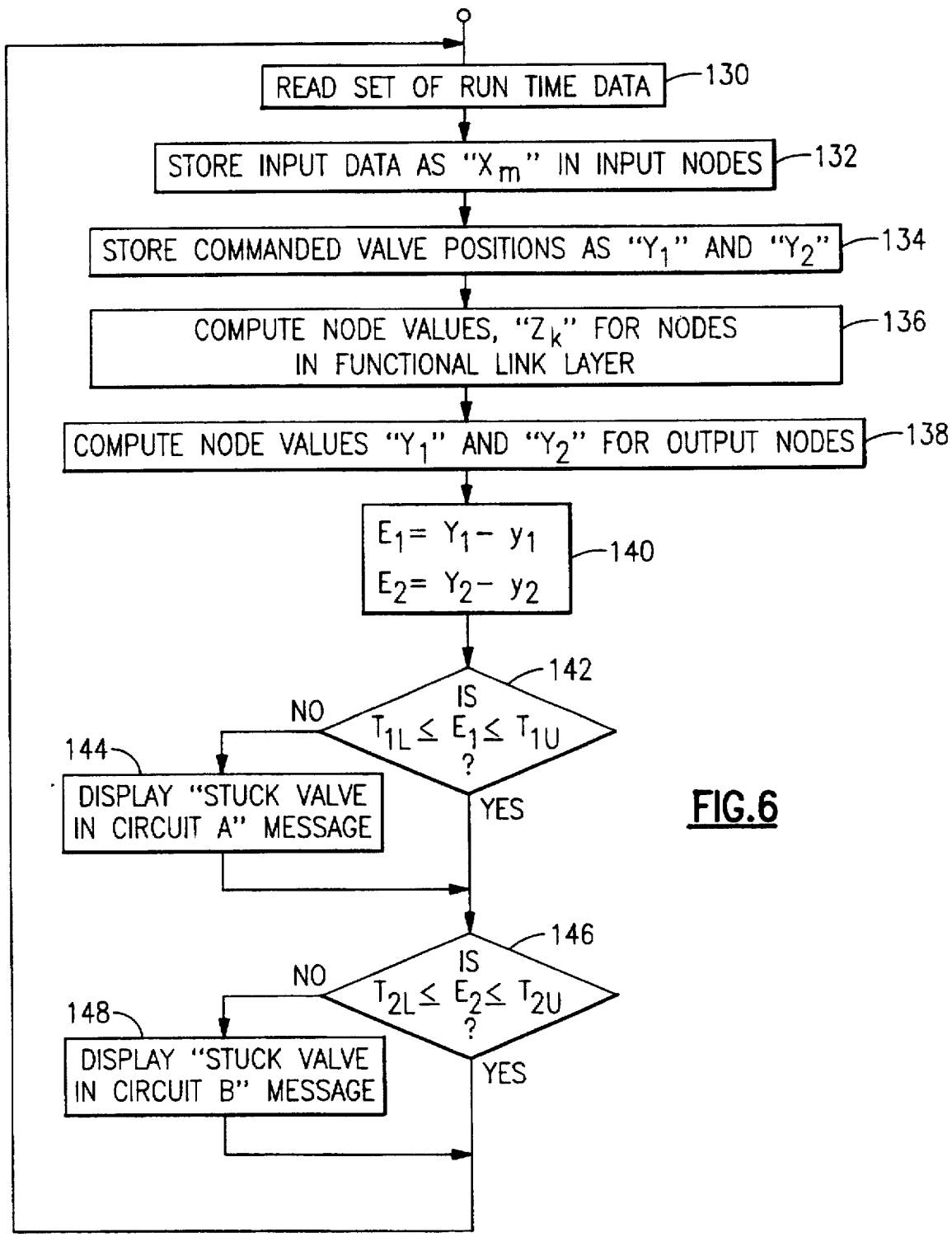
FIG. 6 is a flow chart of a neural-network process executed by the processor of FIG. 2 using the nodes of FIG. 3 during a run time mode of operation.

Referring to FIG. 6, the run time mode of operation of the processor 44 begins with a step 130 wherein a set of run time data is read. The set of run time data will comprise the sensed values from the sensors 46, 48, 50, 52, 54, 56 and 60. It will also include the computed superheats, SH_A and SH_B. Finally, the set of data will also include the commanded positions of the respective expansion valves 20 and 34. The read set of sensor data and the superheats will be stored as run time data inputs "$x_i$" in a step 132. The commanded expansion valve positions will be stored as "$Y_1$" for expansion valve 20 and $Y_2$ for expansion valve 34. The processor will proceed to a step 136 and compute the node values for the thirty-six nodes in the functional link layer. As has been previously discussed with respect to the training mode of operation, the output value for each node of the functional link layer node is a cross-product of the values of two input nodes wherein any such cross-product must not include a previous cross-product of these input node values. This can be summed up in the following:

$$z_k = x_m \bullet x_{m+1}$$

The processor will proceed from having calculated the node values for the nodes of the functional link layer to a step 138 wherein the output values for the output nodes 74 and 80 are calculated. These values are computed as the hyperbolic tangent functions of the respective variables "t" and "u" expressed as follows:

$$y_1 = (e^t - e^{-t})/(e^t + e^{-t})$$

$$y_2 = (e^u - e^{-u})/(e^u + e^{-u})$$

$$\text{wherein } t = \sum_{k=1}^{36} w_{1k} z_k + \sum_{m=1}^{9} w_{1m} x_m + b_1$$

$$\text{wherein } u = \sum_{k=1}^{36} w_{2k} z_k + \sum_{m=1}^{9} w_{2m} x_m + b_2$$

where, $z_k$=functional link node value, k=1, 2, . . . , 36;

$w_{1k}$=weight for output node 74 connected to $k^{th}$ functional link node;

$w_{2k}$=weight for output node 80 connected to $k^{th}$ functional link node;

$x_m$=$m^{th}$ input node value, $w_{1m}$=weight for output node 74 connected to $m^{th}$ input node $w_{2m}$=weight for output node 80 connected to $m^{th}$ input node $b_1$=bias for output node 74;

$b_2$=bias for output node 80;

The processor proceeds to a step 140 and computes any errors between the commanded expansion valve positions and the computed expansion valve positions for the output nodes 74 and 80. These errors are calculated as follows:

$$E_1 = Y_1 - y_1$$

$$E_2 = Y_2 - y_2$$

The processor proceeds from step 140 to a step 142 and inquires as to whether the computed error for the expansion valve 74 in circuit A is less than or equal to a tolerance, "$T_{1U}$" or greater than or equal to a tolerance $T_L$. It is to be understood that the upper and lower tolerances can be by conducting several tests of the run time software and not the errors in each instance and thereafter defining the standard deviation and mean values for the error $E_1$. The upper limit, $T_{1U}$ could then be set at mean value plus three times standard deviation. The lower limit $T_L$ could be set at mean value minus three times standard deviation.

In the even that the error is not within the tolerance range of $T_{1U}$ and $T_L$, the processor will proceed along a no path to a step 144 and display a "stuck expansion valve message" for circuit A. The processor will proceed either directly from step 142 or after having executed step 144 and inquire as to whether the computed error "$E_2$" for expansion valve 84 is less than or equal to tolerance "$T_{2U}$" or greater than or equal to $T_{2L}$. It is to be understood that $T_{2U}$ and $T_{2i}$ may be set as discussed for example with respect to $T_{2U}$ and $T_{2L}$. In the event that the computed error, "$E_2$" is not within the tolerance range of $T_{2U}$ and $T_L$, the processor will proceed to also display a "stuck expansion valve message" for circuit B in step 148. The processor will thereafter proceed back to step 130 and inquire as to whether another set of run time data is available from the controller 40. When the run time data is signaled as being available, the processor will proceed to read the next set of data. This will preferably occur every three minutes from the reading of the last set of run time data.

The processor will again read a new set of run time data from the controller in step 130. These values will be appropriately stored as either input data or commanded expansion valve positions in steps 132 and 134. The processor will ultimately compute new expansion valve positions in step 138. The processor will thereafter compute errors for the respective computed expansion valve positions versus the known commanded valve positions read in step 130 and stored in step 134. Appropriate displays will thereafter occur in the event that either expansion valve is deemed to be in a stuck position.

It is to be appreciated from the above that a displayed message as to the operative status of both expansion valves 74 and 80 will be made on an ongoing basis. As a result of these displayed messages, any operator viewing the control panel of the chiller system can note when a stuck expansion valve problem has occurred.

It is to be appreciated that a particular embodiment of the invention has been described. Alterations, modifications, and improvements may readily occur to those skilled in the art. For example, the neural network within the processor could be set up to only measure the operative status of one expansion valve in one particular refrigeration circuit. The sensed conditions for such a computation would be measured with respect to the single refrigeration circuit with the resulting computations being made only with respect to the values from the single refrigeration circuit. The particular sensed conditions within a refrigeration circuit may also be varied with potentially less or more values being used to define the neural network. Accordingly, the foregoing is by way of example only and the invention is to be limited by the following claims and equivalents thereto.

What is claimed is:

1. A process for monitoring the operation of an expansion valve within at least one refrigeration circuit of a heating or cooling system comprising the steps of:

reading values of information produced by a plurality of sensors located within the heating or cooling system;

processing a set of data consisting of at least some of the read values of information produced by the plurality of sensors through a neural network so as to produce a computed valve position for the expansion valve within the refrigeration circuit of the heating or cooling system;

comparing the computed valve position with a commanded valve position for the expansion valve within the refrigeration circuit of the heating or cooling system; and selectively transmitting a message as to the operation of the expansion valve based upon the comparison of the computed valve position with the commanded valve position.

2. The process of claim 1 wherein the neural network comprises a plurality of input nodes and wherein said step of processing a set of data consisting of at least some of the read values produced by the plurality of sensors through a neural network comprises the step of:

applying each piece of data from the set of data to a corresponding input node in the neural network whereby each piece of data resides within its respective input node.

3. The process of claim 2 wherein the neural network comprises a plurality of interlinking nodes connected to the input nodes and furthermore connected to at least one output node of the neural network and wherein said step of processing a set of data consisting of at least some of the read values produced by the plurality of sensors through a neural network comprises the step:

computing values of the interlinking nodes based upon the values of the set of data applied to the input nodes; and computing a value of the position of the expansion valve at the output node based upon the computed values of the interlinking nodes.

4. The process of claim 3 wherein the neural network further comprises weighted values for connections between the plurality of interlinking nodes connected to the output node and wherein the neural network further comprises weighted values for connections between the input nodes and the output node and wherein said step of computing a value at the output node based upon the computed values of the interlinking nodes comprises the step of:

computing at least one value of the position of the expansion valve at the output node based upon the computed values at the plurality of interlinking nodes, the weighted values for the connections between the plurality of interlinking nodes and the output node and the weighted values for the connections between the input nodes and the output node.

5. The process of claim 1 further comprising the step of:

reading the commanded valve position that is to be compared with the computed valve position at the time the values of information produced by the plurality of sensors within the heating or cooling system are read.

6. The process of claim 1 further comprising the step of:

deriving at least one value of information to be applied to the neural network from the values of information produced by the plurality of sensors located within the heating or cooling system whereby the derived value becomes part of the set of data processed through the neural network so as to produce the computed valve position for the expansion valve.

7. The process of claim 6 wherein the at least one value of information produced by the plurality of sensors located within the heating or cooling system comprises a superheat value for the refrigerant entering a compressor in the refrigeration circuit containing the expansion valve.

8. The process of claim 1 wherein said step of reading values of information produced by a plurality of sensors located within the heating or cooling system comprises:

reading the value of at least one sensor for sensing the suction temperature of a compressor within the refrigeration circuit containing the expansion valve.

9. The process of claim 8 wherein said step of reading values of information produced by a plurality of sensors within the heating or cooling system further comprises:

reading the value of a sensor for sensing the suction pressure of the compressor within the refrigeration circuit containing the expansion valve.

10. The process of claim 9 further comprising the step of:

computing a superheat value of the refrigerant entering the compressor within the refrigeration circuit containing the expansion value as a function of the read value of suction temperature and the read value of suction pressure of the compressor.

11. The process of claim 10 wherein said step of reading values of information produced by a plurality of sensors located within the heating or cooling system further comprises:

reading the value of a sensor for sensing the temperature of a refrigerant entering the expansion valve in the refrigeration circuit.

12. The process of claim 11 wherein said step of reading values of information produced by a plurality of sensors located within the heating or cooling system further comprises:

reading the temperature of a medium entering a heat exchanger associated with the refrigeration circuit containing the expansion valve in the heating or cooling system; and reading the temperature of the medium leaving the heat exchanger whereby the read temperature of the medium entering and leaving the heat exchanger define the heating or cooling load on the heating or cooling system.

13. The process of claim 12 wherein said step of reading values of information produced by a plurality of sensors located within the heating or cooling system further comprises:

reading the temperature of a medium flowing through a second heat exchanger associated with the refrigeration circuit containing the expansion valve.

14. A process for learning the characteristics of a heating or cooling system so as to predict the status of an expansion valve in at least one refrigeration circuit of the heating or cooling system, said process comprising the steps of:

storing a plurality of sets of data obtained from information read from sensors within the heating or cooling system when the system is subjected to various load and ambient conditions for known statuses of the expansion valve; and repetitively processing a number of the stored sets of data through a neural network so as to teach the neural network to accurately predict the known statuses of the expansion valve for the particular sets of data whereby the neural network may be thereafter used to compute the status of the expansion valve from a set of data obtained from information read from sensors within the heating system.

15. The process of claim 14 wherein the neural network comprises a plurality of input nodes for receiving each stored set of data and wherein the neural network further comprises at least one output node for computing the status of the expansion valve and wherein the neural network still further comprises a plurality of interlinking nodes between the plurality of input nodes and the at least one output node, wherein said step of repetitively processing a number of stored sets of data comprises the steps of:

computing the status of the expansion valve at the output node for each set of data; and comparing the computed statuses of the expansion valve for each set of data with the known statuses of the expansion valve for each set of data.

16. The process of claim 15 wherein the statuses of the expansion valve computed at the output node are computed as a function of weighted connections between the output node and the plurality of interlinking nodes and said step of repetitively processing a number of stored sets of data further comprises the steps of:

adjusting weighted connections between the interlinking nodes and the output node when the computed statuses of the expansion valve do not compare favorably with the known statuses of the expansion valve; and repeating said steps of computing the statuses of the expansion valve at the output node and comparing the newly computed statuses of the expansion valve with the known statuses of the expansion valve whereby the newly computed statuses are a function of the adjusted weighted connections between the output node and the plurality of interlinking nodes.

17. The process of claim 16 wherein said step of repetitively processing a number of stored sets of data further comprises the step of:

storing the adjusted weighted connections between the output node and the plurality of interlinking nodes for use thereafter by the neural network to process a set of data when the newly computed statuses of the expansion valve compare favorably with the known statuses of the expansion valve.

18. The process of claim 15 wherein the statuses of the expansion valve computed at the output node are computed as a function of both weighted connections between the output node and the plurality of input nodes and weighted connections between the output node and the input node wherein said step of repetitively processing a number of stored sets of data further comprises the steps of:

adjusting the weighted connections between the output node and the plurality of input nodes and the weighted connections between the output node and the plurality of interlinking nodes when the computed statuses of the expansion valve do not compare favorably with the known statuses of the expansion valve; and repeating said steps of computing the statuses of the expansion valve at the output node and comparing the newly computed statuses of the expansion valve with the known statuses of the expansion valve whereby the newly computed statuses are a function of the adjusted weighted connections between the output node and the plurality of input nodes and the weighted connections between the output node and the plurality of interlinking nodes.

19. The process of claim 18 wherein said step of repetitively processing a number of stored sets of data further comprises the step of:

storing both the adjusted weighted connections between the output node and the input nodes and the adjusted weighted connections between the output node and the plurality of interlinking nodes for use thereafter by the neural network in accurately computing statuses of the expansion valve based upon having processed sets of data.

20. The process of claim 14 wherein said step of storing a plurality of sets of data obtained from information read from sensors within the heating or cooling system comprises:

reading a sensed suction temperature of a compressor within at least one refrigeration circuit of the heating or cooling system each time a particular set of data is to be obtained from information read from sensors within the heating or cooling system; and storing the sensed suction temperature as part of the particular set of data obtained from information read from sensors within the heating or cooling system.

21. The process of claim 20 wherein said step of storing a plurality of sets of data obtained from information read from sensors within the heating or cooling system further comprises:

reading a sensed suction pressure of the compressor within at least one refrigeration circuit of the heating or cooling system each time a particular set of data is to be obtained;

computing a superheat value for the refrigerant entering the compressor as a function of the read and stored sensed suction temperature for the particular set of data and the read suction pressure; and storing the computed superheat value as part of the particular set of data obtained from information read from sensors within the heating or cooling system.

22. The process of claim 21 wherein said step of storing a plurality of sets of data obtained from information read from sensors within the heating or cooling system further comprises:

reading a sensed temperature of a refrigerant before the refrigerant enters the expansion valve in the refrigeration circuit each time a particular set of data is to be obtained from information read from sensors within the heating or cooling system; and storing the sensed temperature as part of the particular set of data obtained from information read from sensors within the heating or cooling system.

23. The process of claim 22 wherein said step of storing a plurality of sets of data obtained from information from sensors within the heating or cooling system comprises the steps of:

reading a sensed temperature of a medium entering a heat exchanger associated with the refrigeration circuit containing the expansion valve;

reading a sensed temperature of the medium leaving the heat exchanger; and storing the sensed temperature of the medium entering and leaving the heat exchanger as part of the particular set of data obtained from information read from sensors within the heating or cooling system.

24. The process of claim 23 wherein said step of storing a plurality of sets of data obtained from information from sensors within the heating or cooling system comprises:

reading a sensed temperature of a medium flowing through a second heat exchanger associated with the refrigeration circuit containing the expansion valve; and storing the sensed temperature of the medium flowing through the second heat exchanger as part of the particular set of data obtained from information read from sensors within the heating or cooling system.

25. A process for monitoring the operation of at least one expansion valve within a refrigeration circuit of a heating or cooling system comprising the steps of:

reading a commanded status for the expansion valve within the refrigeration circuit;

reading information from a plurality of sensors located within the heating or cooling system when reading the commanded status of the expansion valve;

deriving a set of data to be applied to a neural network from the information read from the plurality of sensors located within the heating or cooling system;

processing the set of data through a neural network so as to produce a computed value as to the operative status of the expansion valve; and comparing the computed value as to the operative status of the expansion valve with the read commanded status of the expansion valve; and selectively transmitting messages as to the operation of the expansion valve when the computed value as to the operative status of each expansion valve is not equal to the commanded status of the expansion valve.

26. The process of claim 25 wherein said step of reading information from a plurality of sensors located within the heating or cooling system comprises:

reading a sensed suction temperature of a compressor in the refrigeration circuit of the heating or cooling system.

27. The process of claim 26 wherein said step of reading information from a plurality of sensors located within the heating or cooling system comprises the step of:

reading a sensed suction pressure of the compressor within the refrigeration circuit of the heating or cooling system; and wherein said step of deriving a set of data to be applied to a neural network from the information read from the plurality of sensors located within the heating or cooling system comprises:

computing a superheat value for the refrigerant entering the compressor as a function of the read sensed suction temperature of the compressor and the read sensed suction pressure of the compressor.

28. The process of claim 27 wherein said step of reading information from a plurality of sensors located within the heating or cooling system comprises:

reading a sensed temperature of the refrigerant in the refrigeration circuit before the refrigerant enters the expansion valve in the refrigeration circuit.

29. The process of claim 28 wherein said step of reading information from a plurality of sensors located within the heating or cooling system comprises:

reading a sensed temperature of a medium entering a heat exchanger associated with the refrigeration circuit;

reading a sensed temperature of a medium leaving the heat exchanger associated with the refrigeration circuit.

30. The process of claim 29 wherein said step of reading information from a plurality of sensors located within the heating or cooling system comprises:

reading a sensed temperature of a medium entering a second heat exchanger associated with the refrigeration circuit.

31. The process of claim 30 wherein said step of deriving a set of data to be applied to a neural network further comprises:

including the computed superheat value for the refrigerant entering the compressor, the read suction temperature of the compressor, the read temperature of the refrigerant before entering the expansion value, the read temperatures of the medium entering and leaving the heating exchanger and the read temperature of the medium entering the second heat exchanger within the set of data to be applied to the neural network.

32. The process of claim 25 wherein the neural network comprises a plurality of input nodes for receiving a set of data, at least one output node for computing the operative status of the expansion valve and a plurality of interlinking nodes between the input nodes and the output nodes and wherein said step of processing a set of data comprises the step of:

computing the status of the expansion valve at the output node as a function of the values of the input nodes and the values of the interlinking nodes.

33. The process of claim 25 wherein the neural network comprises a plurality of input nodes for receiving a set of data, at least one output node for computing the operative status of the expansion valve and a plurality of interlinking nodes between the input nodes and the output nodes and wherein the neural network furthermore includes weighted connections between the input nodes and the output node and weighted connections between the interlinking nodes and the output nodes wherein said step of computing the status of the expansion valve comprises the step of:

computing the status of the expansion valve at the output node as a function of the values of the input nodes, values of the weighted connections between the input nodes and the output nodes, the values of the interlinking nodes and the values of the weighted connections between the interlinking nodes and the output nodes.

\* \* \* \* \*